US012394928B2

(12) United States Patent
Aihara

(10) Patent No.: US 12,394,928 B2
(45) Date of Patent: Aug. 19, 2025

(54) CIRCUIT BOARD ELECTRICAL CONNECTOR

(71) Applicant: HIROSE ELECTRIC CO., LTD., Kanagawa (JP)

(72) Inventor: Kazuki Aihara, Kanagawa (JP)

(73) Assignee: HIROSE ELECTRONIC CO., LTD., Kanagawa (JP)

( * ) Notice: Subject to any disclaimer, the term of this patent is extended or adjusted under 35 U.S.C. 154(b) by 329 days.

(21) Appl. No.: 18/103,059

(22) Filed: Jan. 30, 2023

(65) Prior Publication Data

US 2023/0246366 A1 Aug. 3, 2023

(30) Foreign Application Priority Data

Feb. 3, 2022 (JP) ................................ 2022-015585

(51) Int. Cl.
*H01R 12/91* (2011.01)
*H01R 12/71* (2011.01)

(52) U.S. Cl.
CPC ........... *H01R 12/91* (2013.01); *H01R 12/716* (2013.01)

(58) Field of Classification Search
CPC ...... H01R 12/91; H01R 12/716; H01R 12/57; H01R 13/2407; H01R 12/73; H01R 13/02; H01R 12/71; H01R 13/40; H01R 13/2492; H01R 13/2414; H01R 13/502
See application file for complete search history.

(56) References Cited

U.S. PATENT DOCUMENTS 9,225,089 B2 * 12/2015 Sato .................. H01R 13/2457
9,917,403 B2 * 3/2018 Doi ....................... H01R 12/91
10,062,995 B2 8/2018 Doi
(Continued)

FOREIGN PATENT DOCUMENTS

JP 6438382 B2 12/2018
JP 2019-192527 A 10/2019

OTHER PUBLICATIONS

Extended European Search Report (EESR) dated Jun. 9, 2023 for European Patent Application No. 23154232.5.
(Continued)

*Primary Examiner* — Edwin A. Leon
(74) *Attorney, Agent, or Firm* — RANKIN, HILL & CLARK LLP

(57) ABSTRACT

A circuit board electrical connector includes: plurality of terminals; fixed housing fixed to a circuit board via the terminals; and a movable housing relatively movable with respect to the fixed housing, in which the terminals are provided to be bridged between the fixed housing and the movable housing, the terminals include fixed side held portion held by the fixed housing, a movable side held portion positioned on an inner side in a connector width direction than the fixed side held portion and held by the movable housing, and an elastically deformable intermediate portion positioned between the fixed side held portion and the movable side held portion, the intermediate portion includes a plurality of elastic portions reversed by repeating a bending direction in a connector height direction, and the specific elastic portion of the plurality of elastic portions is positioned to he different in the connector height direction from another elastic portion and positioned to have a range overlapping in the connector width direction.

7 Claims, 7 Drawing Sheets

(56) References Cited

U.S. PATENT DOCUMENTS

| | | | | |
|---|---|---|---|---|
| 10,608,361 | B2 * | 3/2020 | Teruki | H01R 13/506 |
| 10,804,630 | B2 | 10/2020 | Horii | |
| 11,152,747 | B2 * | 10/2021 | Shioda | H01R 12/71 |
| 11,381,019 | B2 * | 7/2022 | Morita | H01R 13/24 |
| 11,552,420 | B2 * | 1/2023 | Obata | H01R 12/7005 |
| 2014/0134890 | A1 * | 5/2014 | Kobayashi | H01R 12/712<br>439/691 |
| 2017/0170588 | A1 | 6/2017 | Doi | |

OTHER PUBLICATIONS

Japanese Office Action (JPOA) mailed on Jun. 3, 2025 for the Japanese Patent Application No. 2022-015585 with its English machine translation.

* cited by examiner

CIRCUIT BOARD ELECTRICAL CONNECTOR

CROSS-REFERENCE TO RELATED APPLICATION

This application claims priority from Japanese Patent Application No. 2020-015585 filed with the Japan Patent Office on Feb. 3, 2022, the entire content of which is hereby incorporated by reference.

BACKGROUND

1. Technical Field

One aspect of the present disclosure relates to a circuit board electrical connectors.

2. Related Art

Japanese Patent No. 6438382, for example, discloses a so-called floating connector as a circuit board electrical connector disposed on a circuit board. A floating connector has a plurality of terminals, a fixed housing fixed to a circuit board via the terminals, and a movable housing relatively movable with respect to the fixed housing. Terminals are provided to be bridged between the fixed housing and the movable housing.

In the floating connector of Japanese Patent No. 6438382, terminals are formed by punching a metal plate member in the plate thickness direction. The terminals are divided into a fixed side column portion held by the fixed housing at one end side, a movable side column portion held by the movable housing at the other end side, and an elastic portion capable of elastic deformation positioned between the fixed side column portion and the movable side column portion The elastic portion includes three wavy portions having bending direction repeatedly reversed along the vertical direction, specifically, two inverted U-shaped wavy portions convexly curved upward, and one U-shaped wavy portion convexly curved downward between the two inverted U-shaped sections. The overall shape of the elastic portion is substantially M-shaped (see FIG. 3 (B), FIG. 5, and the like of Japanese Patent No. 6438382). In the elastic portion, two leg portions of each wavy portion are displaced by widening or narrowing in the connector width direction (horizontal direction in FIG. 3 (B) and FIG. 5 of Japanese Patent No. 6438382), and is elastically deformed in the connector width direction. This realizes favorable floating in the connector width direction.

SUMMARY

A circuit board electrical connector includes: plurality of terminals; fixed housing fixed to a circuit board via the terminals; and a movable housing relatively movable with respect to the fixed housing, in which the terminals are provided to be bridged between the fixed housing and the movable housing, the terminals include fixed side held portion held by the fixed housing, a movable side held portion positioned on an inner side in a connector width direction than the fixed side held portion and held by the movable housing, and an elastically deformable intermediate portion positioned between the fixed side held portion and the movable side held portion, the intermediate portion includes a plurality of elastic portions reversed by repeating a bending direction in a connector height direction, and the specific elastic portion of the plurality of elastic portions is positioned to be different in the connector height direction from another elastic portion and positioned to have a range overlapping in the connector width direction.

BRIEF DESCRIPTION OF DRAWINGS

FIG. 5 illustrates a state in which floating occurs in a connector width direction due to vibration received during use of a connector;

FIG. 6 illustrates a state in which floating occurs in a connector height direction due to vibration received during use of a connector; FIG. 7 illustrates a state in which floating occurs in the connector width direction at a time when the mating connection of a connector is completed.

DETAILED DESCRIPTION

Figure 1:
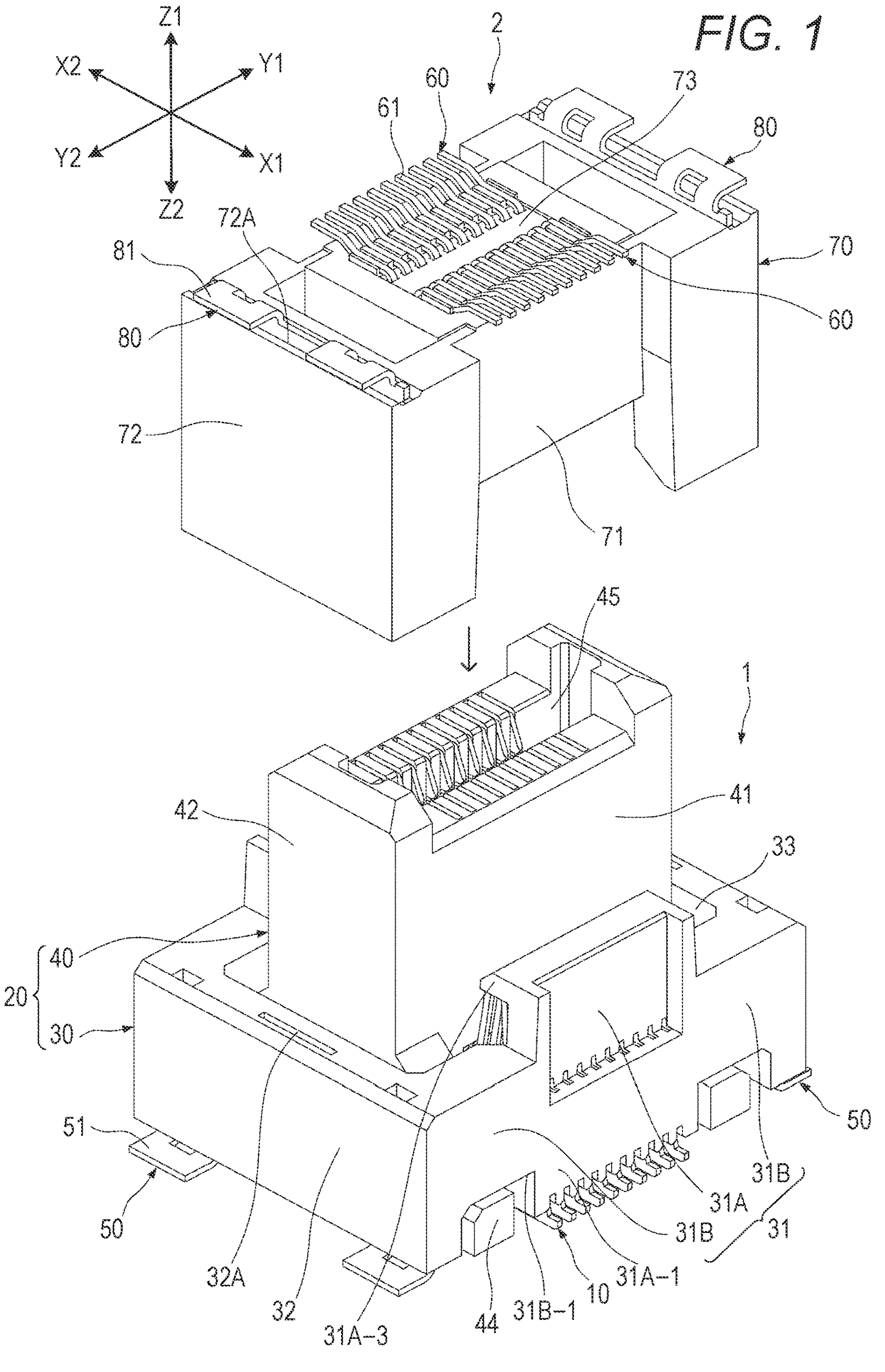
FIG. 1 is a perspective view of a receptacle connector and a plug connector according to an embodiment of the present disclosure, illustrating a state before mating connection of both connectors.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In general, it is preferable that a sufficiently large amount of floating is ensured in a floating connector mounted on a circuit board. For that purpose, it is preferable to increase the length of the elastic portion of the terminal, that is, the spring length. In addition, connectors are often required to be miniaturized, for example, miniaturized in the connector width direction. In the floating connector of Japanese Patent No. 6438382, as described above, the overall shape of the elastic portion of the terminal is substantially M-shaped, and all the wavy portions (three wavy portions described above) are positioned to be different from each other in the connector width direction. Therefore, if the number of wavy portions in the elastic portion of the terminal is increased in order to ensure a larger floating amount, the entire elastic portion becomes larger in the connector width direction. As a result, there is a possibility that the size of the connector is increased in the connector width direction. In this respect, the floating connector of Japanese Patent No. 6438382 has room for improvement.

One object of the present disclosure is to provide a circuit board electrical connector that can easily avoid an increase in size in the connector width direction and can ensure a sufficiently large spring length of a terminal.

A circuit board electrical connector according to an aspect of the present disclosure (the circuit board electrical connector) includes: plurality of terminals; fixed housing fixed to a circuit board via the terminals; and a movable housing relatively movable with respect to the fixed housing, in which the terminals are provided to be bridged between the fixed housing and the movable housing.

In the circuit board electrical connector, the terminals include fixed side held portion held by the fixed housing, a movable side held portion positioned on an inner side in a connector width direction than the fixed side held portion and held by the movable housing, and an elastically deformable intermediate portion positioned between the fixed side held portion and the movable side held portion, the intermediate portion includes a plurality of elastic portions reversed by repeating a bending direction in a connector height direction, and the specific elastic portion of the plurality of elastic portions is positioned to be different in the connector height direction from another elastic portion and positioned to have a range overlapping in the connector width direction.

In the circuit board electrical connector, a specific elastic portion of the plurality of elastic portions provided in the intermediate portion of the terminal is positioned to be different in the connector height direction from another elastic portion and positioned to have a range overlapping in the connector width direction. Therefore, even in a case where the number of elastic portions in the intermediate portion of the terminal is increased and the spring length of the intermediate portion is increased, at least parts of the intermediate portion are overlapped and positioned in the connector width direction. Therefore, compared with the case where all the elastic portions are positioned differently without overlapping as in the typical art, it is easier to avoid an increase in the size of the intermediate portion of the terminal in the connector width direction and thus an increase in the size of the connector.

In the circuit board electrical connector, the plurality of elastic portions may include at least one movable side elastic portion that is an elastic portion positioned between the specific elastic portion and the movable side held portion besides the specific elastic portion, and the at least one movable side elastic portion may be positioned to have a range that overlaps with the movable side held portion in the connector width direction. In this configuration, at least one movable side elastic portion is positioned to have a range that overlaps with the movable side held portion in the connector width direction. As a result, it is possible to ensure a sufficient spring length of the intermediate portion while avoiding an increase in the size of the connector in the connector width direction.

In the circuit board electrical connector, the plurality of elastic portions may include a movable side elastic portion that is an elastic portion positioned between the specific elastic portion and the movable side held portion besides the specific elastic portion, and a fixed side elastic portion that is an elastic portion positioned on a side of the fixed side held portion than the specific elastic portion, the specific elastic portion may be coupled to the movable side elastic portion via a movable side inclined portion and coupled to the fixed side elastic portion via a fixed side inclined portion, and the movable side inclined portion and the fixed side inclined portion may be inclined toward a same side in the connector width direction.

In this configuration, the movable side inclined portion and the fixed side inclined portion that are inclined toward the same side in the connector width direction are provided between the specific elastic portion, and the movable side elastic portion and the fixed side elastic portion. As a result, the elastic portion is positioned on the side where the movable side inclined portion and the fixed side inclined portion are inclined without being largely inclined. Thus, stress generated in the specific portion can be dispersed favorably when the specific elastic portion is elastically deformed in the connector width direction.

In the circuit board electrical connector, the specific elastic portion may include a shape bent on a side away from the circuit board in the connector height direction, and positioned on an outer side in the connector width direction with respect to the movable side held portion, and positioned to have a range that overlaps in the connector height direction. In this configuration, the specific elastic portion is positioned to have a range that overlaps with the movable side held portion in the connector height direction. As a result, it is possible to avoid an increase in size of the connector not only in the connector width direction but also in the connector height direction.

In the circuit board electrical connector, the terminals may further include an arm portion positioned between the intermediate portion and the fixed side held portion, and the arm portion may extend along the connector width direction to be continuous with the intermediate portion, and elastically deformable in the connector height direction. In this configuration, the terminals are provided with the arm portion elastically deformable in the connector height direction. As a result, it is possible to improve the floating function in the connector height direction. In addition, the arm portion extends in the connector width direction. Therefore, increase in size of the terminal and thus the size of the connector in the connector height direction is minimized.

According to the above aspect of the present disclosure, it possible to provide a circuit board electrical connector that can easily avoid an increase in size in the connector width direction and can ensure a sufficiently large spring length of a terminal.

Hereinafter, an embodiment of the present disclosure will be described below based on the accompanying drawings.

FIG. 1 is a perspective view of a receptacle connector 1 and a plug connector 2 according to the present embodiment, illustrating a state before mating connection of both connectors. The receptacle connector 1 is a circuit board electrical connector mounted on a mounting surface of a circuit board (not illustrated). In addition, the plug connector 2 as a mating connection body (mating connector) of the receptacle connector 1 is a circuit board electrical connector mounted on a mounting surface of another circuit board (not illustrated). The receptacle connector 1 and the plug connector 2 are mated and connected in a posture in which the mounting surfaces of the circuit board are parallel to each other and in a connector height direction (vertical direction illustrated as the Z-axis direction) perpendicular to the mounting surfaces. Thus, the electrical connector assembly is constituted. In the present embodiment, the plug connector 2 is mated and connected to the receptacle connector 1 from above.

The receptacle connector 1 includes a plurality of metal plate receptacle terminals 10, a receptacle housing 20 made of an electrical insulating material (for example, made of resin), and a metal receptacle fixing bracket 50. The plurality of receptacle terminals 10 is arranged with one direction (Y-axis direction) parallel to the mounting surface of the circuit board as the terminal arrangement direction. The receptacle housing 20 holds the plurality of receptacle terminals 10. The receptacle fixing brackets 50 are held at both end portions of the receptacle housing 20 in the terminal arrangement direction.

Figure 2:
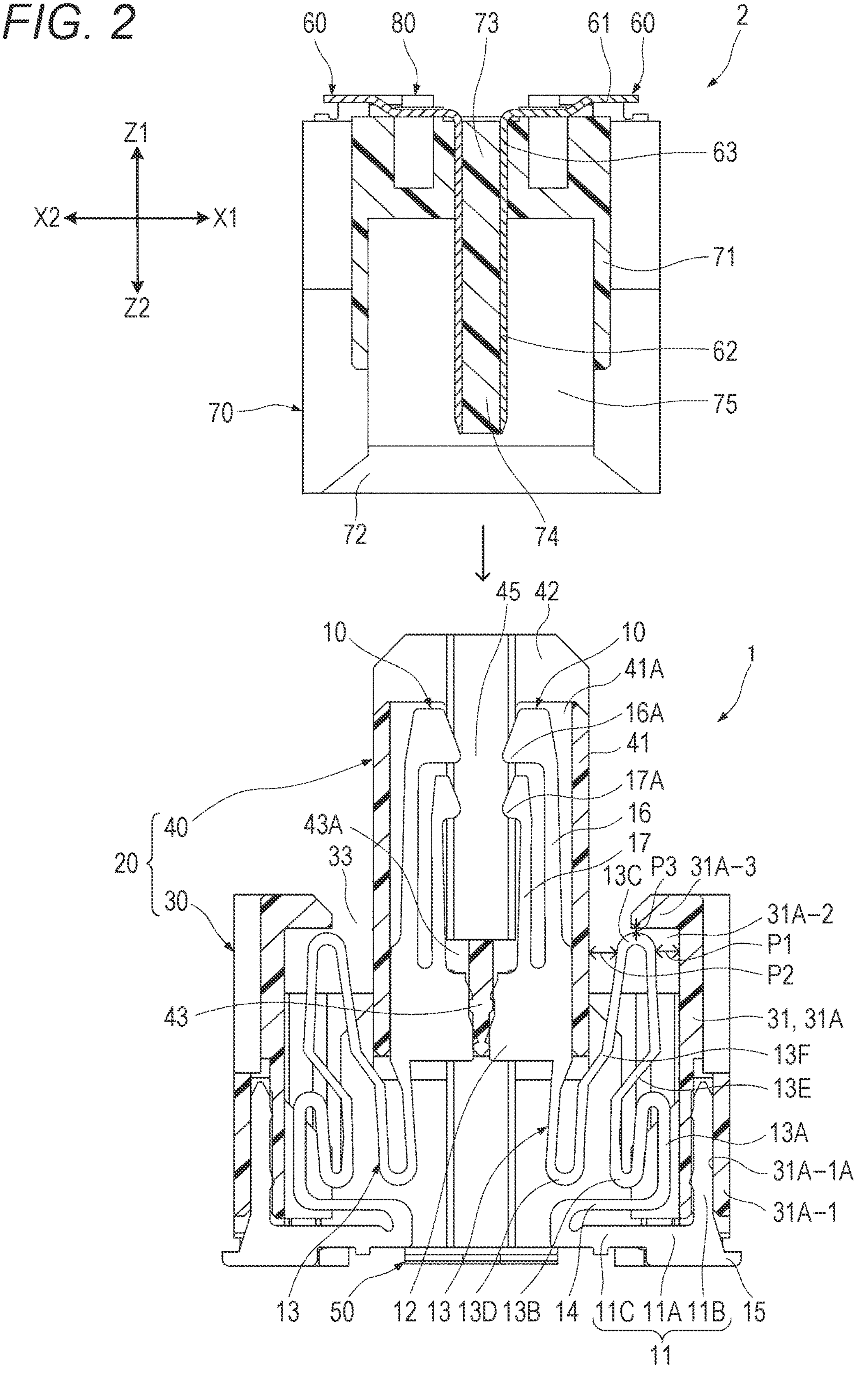
FIG. 2 is a cross-sectional view illustrating a cross section of the receptacle connector and the plug connector of FIG. 1 taken along a plane perpendicular to a terminal arrangement direction, illustrating a state before the mating connection of the both connectors.

FIG. 2 is a cross-sectional view illustrating a cross section of the receptacle connector 1 and the plug connector 2 before the mating connection taken along a plane perpendicular to the terminal arrangement direction, illustrating a cross section at a position of the receptacle terminal 10. The receptacle terminals 10 are arranged in two rows. The two rows of receptacle terminals 10 face each other in a direction symmetrical in the connector width direction (X-axis direction) perpendicular to both the terminal arrangement direction (Y-axis direction) and the vertical direction (Z-axis direction). As illustrated in FIG. 2, the receptacle housing 20 includes a fixed housing 30 fixed to a circuit board (not illustrated) via the receptacle terminal 10 and a movable housing 40 relatively movable with respect to the fixed housing 30. The receptacle terminals 10 are provided to be bridged between the fixed housing 30 and the movable housing 40.

Figure 3:
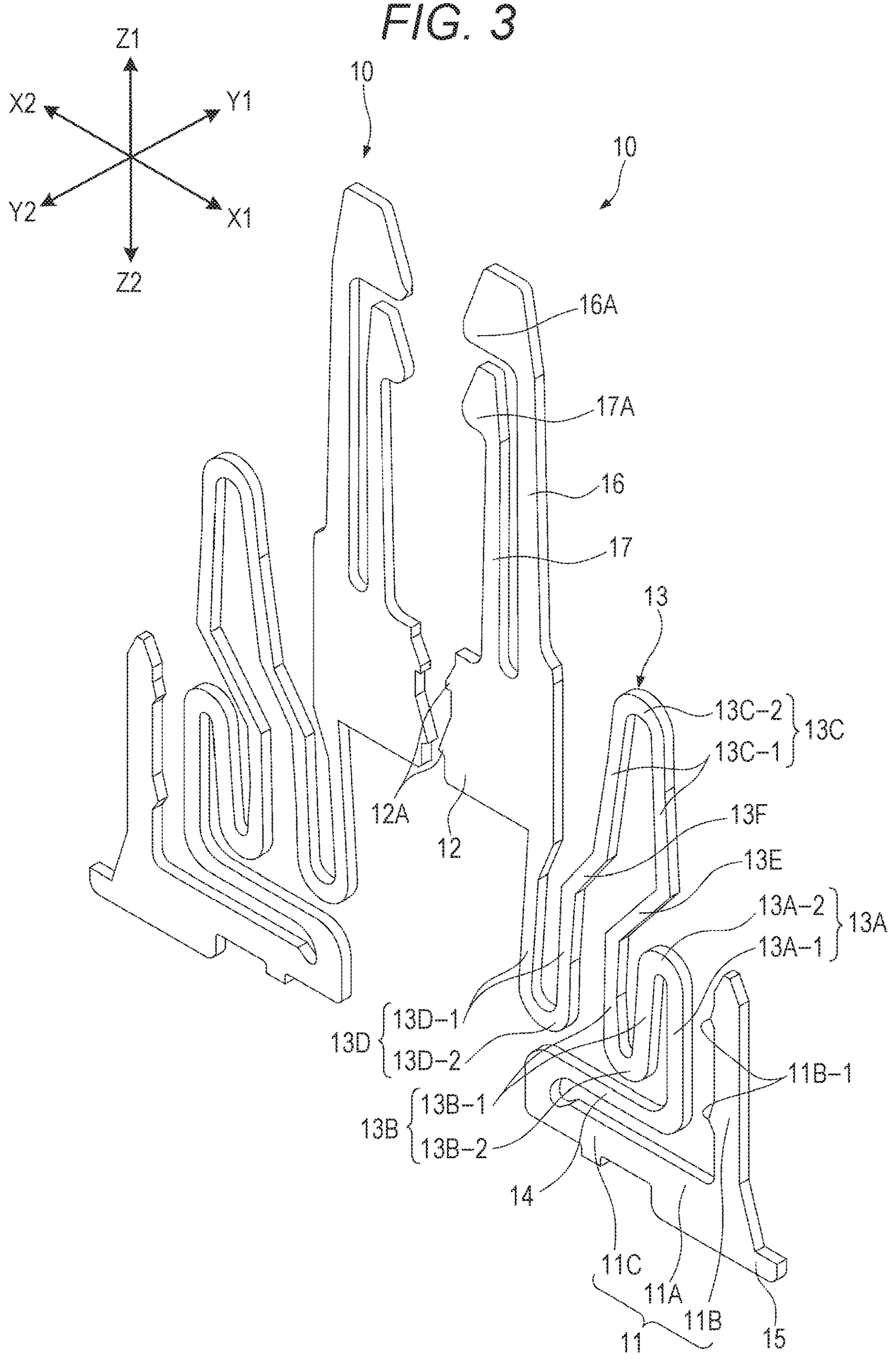
FIG. 3 is a perspective view of a receptacle terminal of the receptacle connector of FIG. 1.

FIG. 3 is a perspective view illustrating two receptacle terminals 10 facing each other in the connector width direction. As illustrated in FIGS. 2 and 3, the receptacle terminal 10 is a female terminal made by punching a metal plate member in the wall thickness direction while maintaining its flat surface. The receptacle terminal 10 includes a fixed side held portion 11 held by the fixed housing 30, a movable side held portion 12 held by the movable housing 40, an intermediate portion 13, a lateral arm portion 14 (arm portion), a connecting portion 15, an outer contact arm portion 16, and an inner contact arm portion 17. The intermediate portion 13 is positioned between the fixed side held portion 11 and the movable side held portion 12 and is elastically deformable. The lateral arm portion 14 (arm portion) is positioned between the fixed side held portion 11 and the intermediate portion 13 and is elastically deformable. The connecting portion 15 extends from the fixed side held portion 11 and is solder-connected to the circuit board. The outer contact arm portion 16 and the inner contact arm portion 17 extend from the movable side held portion 12 and come into contact with the plug connector 2.

Prior to further description of the receptacle terminal 10, configurations of the fixed housing 30 and the movable housing 40 will be described based on FIGS. 1 and 2. As illustrated in FIG. 1, the fixed housing 30 includes a pair of side walls 31 extending in the terminal arrangement direction (Y-axis direction), and a pair of end walls 32 extending in the connector width direction (X-axis direction) and coupling the end portions of the pair of side walls 31. The fixed housing 30 forms peripheral walls with the pair of side walls 31 and the pair of end walls 32. The space surrounded by the peripheral wall and penetrating the vertical direction forms a central space 33 that accommodates a part of the movable housing 40 from below (see also FIG. 2).

As illustrated in FIG. 1, in the side wall 31, a side wall central portion 31A that is positioned in the central region in the terminal arrangement direction is formed to protrude upward than a side wall end portion 31B positioned in both end regions. This side wall central portion 31A arranges and holds the receptacle terminals 10. As illustrated in FIG. 2, the side wall central portion 31A is provided to overlap the entire intermediate portion 13 of the receptacle terminal 10 in the vertical direction. A lower portion of the side wall central portion 31A forms a terminal holding portion 31A-1 for holding the receptacle terminal 10. Specifically, a terminal holding hole portion 31A-1A extending in the vertical direction is formed penetrating through the terminal holding portion 31A-1. The terminal holding portion 31A-1 is configured to hold a held arm portion 11B, which will be described later, of the receptacle terminal 10 press-fit from below by the terminal holding hole portion 31A-1A.

In addition, as illustrated in FIG. 2, the side wall central portion 31A is formed in a manner that a fixed side accommodating portion 31A-2 for accommodating a part of the intermediate portion 13 of the receptacle terminal 10 is recessed from the inner surface of the side wall central portion 31A (a surface perpendicular to the connector width direction) and extends over the entire region of the side wall central portion 31A in the terminal arrangement direction. The fixed side accommodating portion 31A-2 extends in the vertical direction within a range from the position near the upper end of the side wall 31 to the lower end in the vertical direction. In addition, a top wall 31A-3 is formed on the upper portion of the side wall central portion 31A. The top wall 31A-3 projects inward in the connector width direction from the inner wall surface of the side wall central portion 31A and closes the upper end of the fixed side accommodating portion 31A-2. In other words, the inner surface of the side wall central portion 31A (the surface perpendicular to the connector width direction) forms the side inner wall surface of the fixed side accommodating portion 31A-2. Furthermore, the lower surface of the top wall 31A-3 (the surface perpendicular to the vertical direction) forms the upper inner wall surface of the fixed side accommodating portion 31A-2. Note that the lower end of the fixed side accommodating portion 31A-2 is opened.

As illustrated in FIG. 2, the top wall 31A-3 is provided to have a range that overlaps with a part of the intermediate portion 13 of the receptacle terminal 10 in the connector width direction. Specifically, the top wall 31A-3 has a range that overlaps with the entire portion of a first elastic portion 13A, a part of a second elastic portion 13B (an outer portion in the connector width direction), and a part of a third elastic portion 13C (an outer portion in the connector width direction), and the entire portion of a fixed side inclined portion 13E, which will be described later.

As illustrated in FIG. 1, in the side wall end portion 31B, a restriction concave portion 31B-1 that restricts the upward movement of the movable housing 40 is formed to be recessed from the lower surface of the side wall end portion 31B and penetrate in the connector width direction (wall thickness direction of side wall end portion 31B). As illustrated in FIG. 1, the restriction concave portion 31B-1 accommodates a restricted portion 44 of the movable housing 40, which will be described later, from below. The restricting concave portion 31B-1 restricts the upward movement of the restricted portion 44 by positioning its upper inner wall surface to be able to abut on the upper surface of the restricted portion 44.

In the end wall 32, as illustrated in FIG. 1, an end groove portion 32A is formed in a slit shape extending perpendicularly to the terminal arrangement direction. This end groove portion 32A accommodates and press-fits and holds a part of the receptacle fixing bracket 50.

The movable housing 40 disposed by being inserted into the central space 33 of the fixed housing 30 from below. As can be seen in FIG. 1, the majority of the movable housing 40, excluding the upper half portion and the restricted portion 44, which will be described later, is accommodated in the central space 33 (see also FIG. 2). The movable housing 40 includes a pair of long walls 41 extending in the terminal arrangement direction, a pair of short walls 42, a bottom wall 43 (see FIG. 2), and the restricted portion 44. The pair of short walls 42 extends in the connector width direction and couples the end portions of the pair of long walls 41. The bottom wall 43 closes the space surrounded by the peripheral walls including the pair of long walls 41 and the pair of short walls 42 from below. The restricted portion 44 extends outward in the connector width direction from the lower portion of the short wall 42. The space surrounded by the peripheral wall and opened upward forms a receiving portion 45 for receiving a part of the plug connector 2.

As illustrated in FIG. 2, the portion accommodated in the central space 33 in the movable housing 40 includes a part of the intermediate portion 13 of the receptacle terminal 10 in the vertical direction, specifically, a range overlapping with the entire portion of the third elastic portion 13C, which will be described later.

In the long wall 41, as illustrated in FIG. 2, a movable side accommodating portion 41A recessed from the inner wall surface over the entire region in the vertical direction is arranged and formed. The movable side accommodating portion 41A accommodates the outer contact arm portion 16 and the inner contact arm portion 17 of the receptacle terminal 10.

As illustrated in FIG. 2, the bottom wall 43 is positioned in the space of the upper half portion of the central space 33 of the fixed housing 30. In the bottom wall 43, a bottom groove portion 43A for accommodating and press-fitting and holding the movable side held portion 12 of the receptacle terminal 10 from below is arranged and formed in the terminal arrangement direction. As illustrated in FIG. 2, the bottom groove portion 43A has a slit shape extending perpendicularly to the terminal arrangement direction. The bottom groove portion 43A penetrates the bottom wall 43 in the vertical direction and communicates with the movable housing portion 41A.

The restricted portion 44 extends outward in the connector width direction from the outer surface of the lower portion of the short wall 42 (the surface perpendicular to the connector width direction). The distal end portion of the restricted portion 44 is accommodated in the restriction concave portion 31B-1 of the fixed housing 30, and positioned to have a gap in the vertical direction and the terminal arrangement direction with respect to the inner wall surface of the restriction concave portion 31B-1. Therefore, the restricted portion 44 and the movable housing 40 are movable in the vertical direction and the terminal arrangement direction within the range of the gap, and the restricted portion 44 abuts on the inner wall surface of the restriction concave portion 31B-1. Thus, further movement is restricted.

Description will go back to the receptacle terminal 10. As illustrated in FIGS. 2 and 3, the fixed side held portion 11 of the receptacle terminal 10 includes a base portion 11A positioned in the lower portion of the fixed housing 30, the held arm portion 1113 extending upward from the base portion 11A, and an extended portion 11C extending inwardly in the connector width direction from the base portion 11A. The held arm portion 11B extends in a straight shape within the terminal holding hole portion 31A-1A of the fixed housing 30 from the position of the base portion 11A that is closer to the outer side in the connector width direction. As illustrated in FIG. 3, the held arm portion 11B includes a plurality of press-fit protrusions 11B-1 on the inner edge (the edge extending in the vertical direction) in the connector width direction. The held arm portion 11B is press-fit and held in the terminal holding hole portion 31A-1A by the press-fit protrusions 11B-1. The extending portion 11C extends in a straight shape from the base portion 11A inward in the connector width direction. As illustrated in FIG. 2, the extending portion 11C is positioned to have a gap between it and the mounting surface (upper surface) of the circuit board (not illustrated) in the vertical direction.

As illustrated in FIGS. 2 and 3, the lateral arm portion 14 extends along the upper edge of the fixed side held portion 11 from the distal end portion of the extended portion 11C (the inner side end portion in the connector width direction) and extends straight outward in the connector width direction. The lateral arm portion 14 is positioned directly below the intermediate portion 13. The lateral arm portion 14 is positioned to have a gap between it and the fixed side held portion 11 in the vertical direction. The lateral arm portion 14 is elastically deformable in the vertical direction within the range of the gap, with its base end portion, that is, the portion coupled to the distal end portion of the extended portion 11C as a fulcrum.

Thus, by providing the receptacle terminal 10 in the lateral arm portion 14 elastically deformable in the vertical direction, the floating function in the vertical direction can be improved. The lateral arm portion 14 extends in the connector width direction. Therefore, increase in size of the receptacle terminal 10 and thus the receptacle connector 1 in the vertical direction by providing the lateral arm portion 14 is minimized. In addition, the lateral arm portion 14 is positioned within the range of the intermediate portion 13 in the connector width direction. As a result, an increase in the size of the receptacle terminal 10 and thus the receptacle connector 1 in the connector width direction is avoided. It should be noted that providing the lateral arm portion 14 is not necessary in a case where a sufficiently large amount of elastic deformation in the vertical direction can be ensured in the intermediate portion 13.

The connecting portion 15 extends in the connector width direction continuously to the lower portion of the base portion 11A of the fixed side held portion 11. As illustrated in FIG. 2, the distal end of the connecting portion 15 extends outside the fixed housing 30. The connecting portion 15 is solder-connected to the corresponding circuit portion on the mounting surface of the circuit board at its lower end.

The movable side held portion 12 is held by the bottom wall 43 of the movable housing 40, as illustrated in FIG. 2. As illustrated in FIG. 3, the movable side held portion 12 includes a plurality of press-fit protrusions 12A on the inner edge (the edge extending in the vertical direction) in the connector width direction. The movable side held portion 12 is press-fit and held from below in the bottom groove portion 43A of the bottom wall 43 by the press-fit protrusions 12A.

As illustrated in FIG. 2, the outer contact arm portion 16 extends straight upward from the position of the movable side held portion 12 that is closer to the outer side in the connector width direction into the movable side accommodating portion 41A of the movable housing 40. At the upper end portion of the outer contact arm portion 16, as illustrated in FIGS. 2 and 3, an upper contact portion 16A for contacting a plug terminal 60 (see FIG. 2) of the plug connector 2 is provided. It is formed to protrude toward the inner side in the connector width direction. As illustrated in FIG. 2, the inner contact arm portion 17 is positioned on the inner side than the outer contact arm portion 16 in the connector width direction. The inner contact arm portion 17 extends straight upward from the movable side held portion 12 in the movable side accommodating portion 41A of the movable housing 40. The inner contact arm portion 17 is shorter than the outer contact arm portion 16, as illustrated in FIGS. 2 and 3. The upper end portion of the inner contact arm portion 17 is positioned directly below the upper contact portion 16A of the outer contact arm portion 16. At the upper end portion of the inner contact arm portion 17, the lower contact portion 17A for contact with the plug terminal 60 of the plug connector 2 is formed to protrude inward in the connector width direction.

Hereinafter, in a case where the outer contact arm portion 16 and the inner contact arm portion 17 need not be distinguished specifically, they are collectively referred to as "contact arm portions 16 and 17". In addition, in a case where the upper contact portion 16A and the lower contact portion 17A need not be distinguished specifically, they are collectively referred to as "contact portions 16A and 17A".

As illustrated in FIG. 2, when the contact arm portions 16 and 17 are in the free state, the protruding ends of the contact portions 16A and 17A protrude from the movable side accommodating portion 41A and are positioned within the receiving portion 45. Then, when the plug connector 2 is mated and connected to the receptacle connector 1, the protruding ends of the contact portions 16A and 17A receive the pressing force from the plug terminal 60. As a result, the contact arm portions 16 and 17 are elastically deformed outward in the connector width direction.

As illustrated in FIGS. 2 and 3, the intermediate portion 13 includes four elastic portions that are positioned between the lateral arm portion 14 and the movable side held portion 12 and reversed by repeating the bending direction in the vertical direction (Z-axis direction). As a result, the intermediate portion 13 is elastically deformable in the connector width direction, the terminal arrangement direction, and the vertical direction. Specifically, the intermediate portion 13 has the first elastic portion 13A, the second elastic portion 13B (fixed side elastic portion), and the third elastic portion 13C (specific elastic portion), and a fourth elastic portion 13D (movable side elastic portion) from the lateral arm portion 14 side toward the movable side held portion 12 side in this order. In addition, as illustrated in FIGS. 2 and 3, the third elastic portion 13C is coupled to the second elastic portion 13B via the fixed side inclined portion 13E, and is coupled to the fourth elastic portion 13D via a movable side inclined portion 13F.

As illustrated in FIG. 3, the first elastic portion 13A has an inverted J shape as a whole. The first elastic portion 13A includes a first straight portion 13A-1 that is extending straight upward from the end portion of the lateral arm portion 14 (the outer end portion in the connector width direction) and a first bent portion 13A-2 that is bent inward and downward in the connector width direction from the upper end of the straight portion 13A-1. The first elastic portion 13A is elastically deformable in the connector width direction with the lower end portion of the first straight portion 13A-1 as a fulcrum.

As illustrated in FIG. 2, the first elastic portion 13A is provided below the bottom surface of the bottom wall 43 of the movable housing. The first elastic portion 13A is accommodated in the fixed side accommodating portion 31A-2 of the fixed housing 30. In addition, the first elastic portion 13A is positioned to have a gap in the connector width direction between the first elastic portion 13A and the side inner wall surface (the wall surface perpendicular to the connector width direction) of the fixed side accommodating portion 31A-2. The first elastic portion 13A can be elastically deformed outward in the connector width direction within the range of this gap.

As illustrated in FIG. 3, the second elastic portion 13B has a U shape as a whole. The second elastic portion 13B includes two second straight portions 13B-1 extending in the vertical direction and a second bent portion 13B-2 having an upwardly bent shape coupling lower end portions of the second straight portions 13B-1. The second elastic portion 13B is elastically deformable in the connector width direction when the interval between the two second straight portions 13B-1 is narrowed or widened.

The second elastic portion 13B is provided on the inner side than the first elastic portion 13A in the connector width direction and positioned in substantially the same range as the first elastic portion 13A in the vertical direction. Therefore, the second elastic portion 13B forms a horizontal S shape together with the first elastic portion 13A. In addition, as illustrated in FIG. 2, the second straight portion 13B-1 positioned on the outer side in the connector width direction of the two second straight portions 13B-1 and a portion of the second bent portion 13B-2 positioned on the outer side in the connector width direction is accommodated in the fixed side accommodation portion 31A-2.

As illustrated in FIG. 3, the third elastic portion 13C has an inverted U shape as a whole. The third elastic portion 13C includes two third straight portions 13C-1 extending in the vertical direction and a third bent portion 13C-2 having a downwardly bent shape coupling upper end portions of the third straight portions 13C-1. As illustrated in FIGS. 2 and 3, the two third straight portions 13C-1 extend to be slightly inclined in a direction away from each other as they go downward. The third elastic portion 13C is elastically deformable in the connector width direction when the interval between the two third straight portions 13C-1 is narrowed or widened.

As illustrated in FIGS. 2, the third elastic portion 13C is provided above the first elastic portion 13A, the second elastic portion 13B, and the fourth elastic portion 13D of the intermediate portion 13. Therefore, the third elastic portion 13C is positioned to be different in the vertical direction (connector height direction) with respect to the first elastic portion 13A, the second elastic portion 13B, and the fourth elastic portion 13D of the intermediate portion 13. That is, the third elastic portion 13C is disposed at a position different in the vertical direction from those of the first elastic portion 13A, the second elastic portion 13B, and the fourth elastic portion 13D of the intermediate portion 13.

The third elastic portion 13C is positioned to have a range that overlaps with the movable side held portion 12 in the vertical direction. Thus, by providing the third elastic portion 13C at a position overlapping with the movable side held portion 12, an increase in size of the receptacle connector 1 in the vertical direction is avoided. A portion of the third elastic portion 13C, specifically, the third straight portion 13C-1 positioned on the outer side in the connector width direction of the two third straight portions 13C-1, and a portion of the third bent portion 13C-2 positioned on the outer side in the connector width direction is accommodated in the fixed side accommodating portion 31A-2 as illustrated in FIG. 2.

As illustrated in FIG. 2, the third elastic portion 13C is positioned to have a gap P1 in the connector width direction between the third elastic portion 13C and the side inner wall surface of the fixed side accommodating portion 31A-2, that is, the inner side surface of the side wall central portion 31A. The third elastic portion 13C can be elastically deformed outward in the connector width direction within the range of the gap P1. In addition, as illustrated in FIG. 2, the third elastic portion 13C is positioned to have a gap P2 between the third elastic portion 13C and the outer wall surface of the movable housing 40, that is, the side wall surface of the bottom wall 43 (the surface perpendicular to the connector width direction). The third elastic portion 13C can be elastically deformed inward in the connector width direction within the range of this gap P2. In addition, as illustrated in FIG. 2, the third elastic portion 13C is positioned to have a gap P3 in the connector width direction between the third elastic portion 13C and the upper inner wall surface of the fixed side accommodating portion 31A-2, that is, the lower surface of the top wall 31A-3. The third elastic portion 13C can be elastically deformed upward, that is, in a direction away from the circuit board (not illustrated) within the range of this gap P3.

As illustrated in FIG. 3, the fourth elastic portion 13D has a U shape as a whole. The fourth elastic portion 13D includes fourth second straight portions 13D-1 extending in the vertical direction and a fourth bent portion 13D-2 having an upwardly bent shape coupling lower end portions of the fourth straight portions 13D-1. The fourth elastic portion 13D is elastically deformable in the connector width direction when the interval between the two fourth straight portions 13D-1 is narrowed or widened.

The fourth elastic portion 13D is positioned on the inner side of the first elastic portion 13A, the second elastic portion 13B, and the third elastic portion 13C in the connector width direction, and is provided in substantially the same range as the first elastic portion 13A and the second elastic portion 13B in the vertical direction. In addition, as illustrated in FIG. 2, the fourth elastic portion 13D is positioned directly below the bottom wall 43 of the movable housing 40 in the vertical direction, and within the range of the wall thickness of the long walls 41 of the movable housing 40 in the connector width direction. In the fourth elastic portion 13D, as illustrated in FIGS. 2 and 3, the fourth straight portion 13D-1 positioned on the inner side in the connector width direction of the two fourth straight portions 13D-1, and the portion of the fourth bent portion 13D-2 that is positioned on the inner side in the connector width direction is positioned directly below the movable side held portion 12 in the vertical direction and positioned within the range of the movable side held portion 12 in the connector width direction.

Thus, in the present embodiment, the fourth elastic portion 13D is positioned to have a range that overlaps with the movable side held portion 12 in the connector width direction. As a result, it is possible to ensure a sufficient spring length of the intermediate portion 13 while avoiding an increase in the size of the receptacle connector 1 in the connector width direction. In the present embodiment, in the connector width direction, as the movable side elastic portion having a range that overlaps with the movable side held portion 12 on the inner side than the third elastic portion 13C, only one elastic portion that is, the fourth elastic portion 13D is provided. In this regard, two or more movable side elastic portions may be provided.

As illustrated in FIGS. 2 and 3, the fixed side inclined portion 13E and the movable side inclined portion 13F extend straight to be inclined outward in the connector width direction as they go upward. As described above, the third elastic portion 13C is coupled to the second elastic portion 13B via the fixed side inclined portion 13E, and is coupled to the fourth elastic portion 13D via the movable side inclined portion 13F. As a result, the third elastic portion 13C is positioned to have a range that overlaps with the first elastic portion 13A and the second elastic portion 13B in the connector width direction. As a result, the third elastic portion 13C is disposed at a position that overlaps with at least a part of another elastic portion (first elastic portion 13A and second elastic portion 13B) in the connector width direction. Specifically, the portion of the third elastic portion 13C from the third straight portion 13C-1 to the third bent portion 13C-2, positioned on the outer side in the connector width direction, is positioned overlapping with the portion of the first elastic portion 13A from the first bent portion 13A-2 to the second elastic portion 13B in the connector width direction.

Thus, in the present embodiment, the third elastic portion 13C is positioned to have a range that overlaps with the first elastic portion 13A and the second elastic portion 13B in the connector width direction. Therefore, even if a plurality of elastic portions is provided in the intermediate part 13 and the spring length of the intermediate part 13 is increased, compared with the case where all the elastic portions are positioned differently without overlapping as in the typical art, it is easier to avoid an increase in the size of the intermediate portion 13 of the receptacle terminal 10 in the connector width direction and thus an increase in the size of the receptacle connector 1.

In addition, in the present embodiment, the fixed side inclined portion 13E and the movable side inclined portion 13F that are inclined on the same side as in the connector width direction (outer side in the present embodiment) are provided between the third elastic portion 13C, and the second elastic portion 13B and the fourth elastic portion 13D. As a result, the third elastic portion 13C can be positioned on the outer side in the connector width direction without being largely inclined. Thus, stress generated in the third elastic portion 13C can be dispersed favorably when the third elastic portion 13C is elastically deformed in the connector width direction.

The receptacle fixing bracket 50 is made by bending a metal plate member in a plate thickness direction. The receptacle fixing bracket 50 is bent at the lower edge of the held plate portion (not illustrated) held by the end walls 32 of the fixed housing 30 and the both end portions of the held plate portion in the connector width direction, and includes a fixed portion 51 (see FIG. 1) extending outward in the terminal arrangement direction. The receptacle fixing bracket 50 is held by press-fitting the held plate portion into the end groove portion 32A of the end wall 32 from below, and is solder-connected to the mounting surface of the circuit board on the lower surface of the fixed portion 51.

Next, the configuration of the plug connector 2 will be described based on FIGS. 1 and 2. The plug connector 2 includes a plurality of metal plate plug terminals 60, a plug housing 70 made of an electrical insulating material (for example, made of resin), and a metal plug fixing bracket 80. The plug terminals 60 is arranged with one direction (Y-axis direction of FIGS. 1 and 2) parallel to the mounting surface of the circuit board as the terminal arrangement direction. The plug housing 70 includes a plurality of plug terminals 60. The plug fixing brackets 80 are held at both end portions of the plug housing 70 in the terminal arrangement direction. As seen in FIGS. 1 and 2, the plug terminals 60 are arranged in two rows. The two rows of plug terminals 60 face each other in such a direction as to be symmetrical in the connector width direction.

As illustrated in FIGS. 1 and 2, the plug housing 70 includes a pair of side walls 71 extending in the terminal arrangement direction (Y-axis direction), a pair of end walls 72, a bottom wall 73, and a central wall 74. The pair of end walls 72 extends in the connector width direction (X-axis direction) and couples the end portions of the pair of side walls 71. The bottom wall 73 closes the upper end of the peripheral wall formed by the pair of side walls 71 and the pair of end walls 72. The central wall 74 rises from the bottom wall 73 within the peripheral wall. As illustrated in FIG. 2, the annular space surrounded by the peripheral wall and the central wall 74 and opened downward includes a receiving portion 75 formed for receiving the peripheral wall of the movable housing 40 of the receptacle connector 1 from below. In the end wall 72, as illustrated in FIG. 1, an end groove portion 72A is formed in a slit shape extending perpendicularly to the terminal arrangement direction. This end groove portion 72A accommodates and press-fits and holds a part of the plug fixing bracket 80.

The plug terminal 60 is a male terminal made by bending a metal strip in the wall thickness direction. As illustrated in FIG. 2, the plug terminal 60 includes a connecting portion 61 formed at one end side, a contact arm portion 62 formed at the other end side, and a held portion 63 coupling the connecting portion 61 and the contact arm portion 62. The connecting portion 61 extends in the connector width direction along the bottom surface of the bottom wall 73 of the plug housing 70 (top surface in FIGS. 1 and 2). The connecting portion 61 is solder-connected to the corresponding circuit portion on the mounting surface of the circuit board (not illustrated). As illustrated in FIG. 2, the contact arm portion 62 extends straight in the vertical direction along the side surface of the central wail 74. The contact arm portion 62 has a plate surface exposed to the receiving portion 75. The contact arm portion 62 can contact the contact portions 16A and 17A of the receptacle terminal 10 by this plate surface. As illustrated in FIG. 2, the held portion 63 has an inverted L shape. The held portion 63 is held by integral molding (insert molding) on the bottom wall 43 of the plug housing 70 by the vertically extending portion.

The plug fixing bracket 80 is made by bending a metal plate member in a plate thickness direction. The plug fixing bracket 80 includes a held plate portion (not illustrated) held by the end walls 72 of the plug housing 70 and includes a fixed portion 81 (see FIG. 1) extending outward in the direction. The fixed portion 81 is bent at the upper edge of the both end portions of the held plate portion in the connector width direction and extends outward in the terminal arrangement direction. As illustrated in FIG. 1, the plug fixing bracket 80 is held by press-fitting the held plate portion into the end groove portion 72A of the end wall 72 from above. Furthermore, the plug fixing bracket 80 is solder-connected to the mounting surface of the circuit board on the upper surface of the fixed portion 81.

Next, the mating connection operation between the receptacle connector 1 and the plug connector 2 will be described with reference to FIGS. 1, 2 and 4. Here, FIG. 4 is a cross-sectional view illustrating a cross section of the receptacle connector 1 and the plug connector 2 in a mating connection state taken along a plane perpendicular to the terminal arrangement direction, illustrating a cross section at a position of the receptacle terminal 10.

First, the receptacle connector 1 and the plug connector 2 are mounted on the corresponding mounting surfaces of a circuit board (not illustrated) by solder connection. That is, the receptacle connector 1 is attached to the circuit board by solder-connecting the connecting portion 15 of the receptacle terminal 10 and the fixed portion 51 of the receptacle fixing bracket 50 by solder-connecting to the mounting surface. The plug connector 2 is attached to the circuit board by solder-connecting the connecting portion 61 of the plug terminal 60 and the fixed portion 81 of the plug fixing bracket 80 by solder-connecting to the mounting surface.

Next, as seen in FIGS. 1 and 2, the plug connector 2 is positioned above the receptacle connector 1 in the posture with the receiving portion 75 (see FIG. 2) facing downward. After that, by lowering the plug connector 2 in the same posture, the central wall 74 is caused to enter the receiving portion 45 of the movable housing 40 of the receptacle connector 1 from above. At the same time, the peripheral wall of the movable housing 40 enters the receiving portion 75 of the plug connector 2 from below. Thus, as illustrated in FIG. 4, the receptacle connector 1 and the plug connector 2 are mated together.

Figure 4:
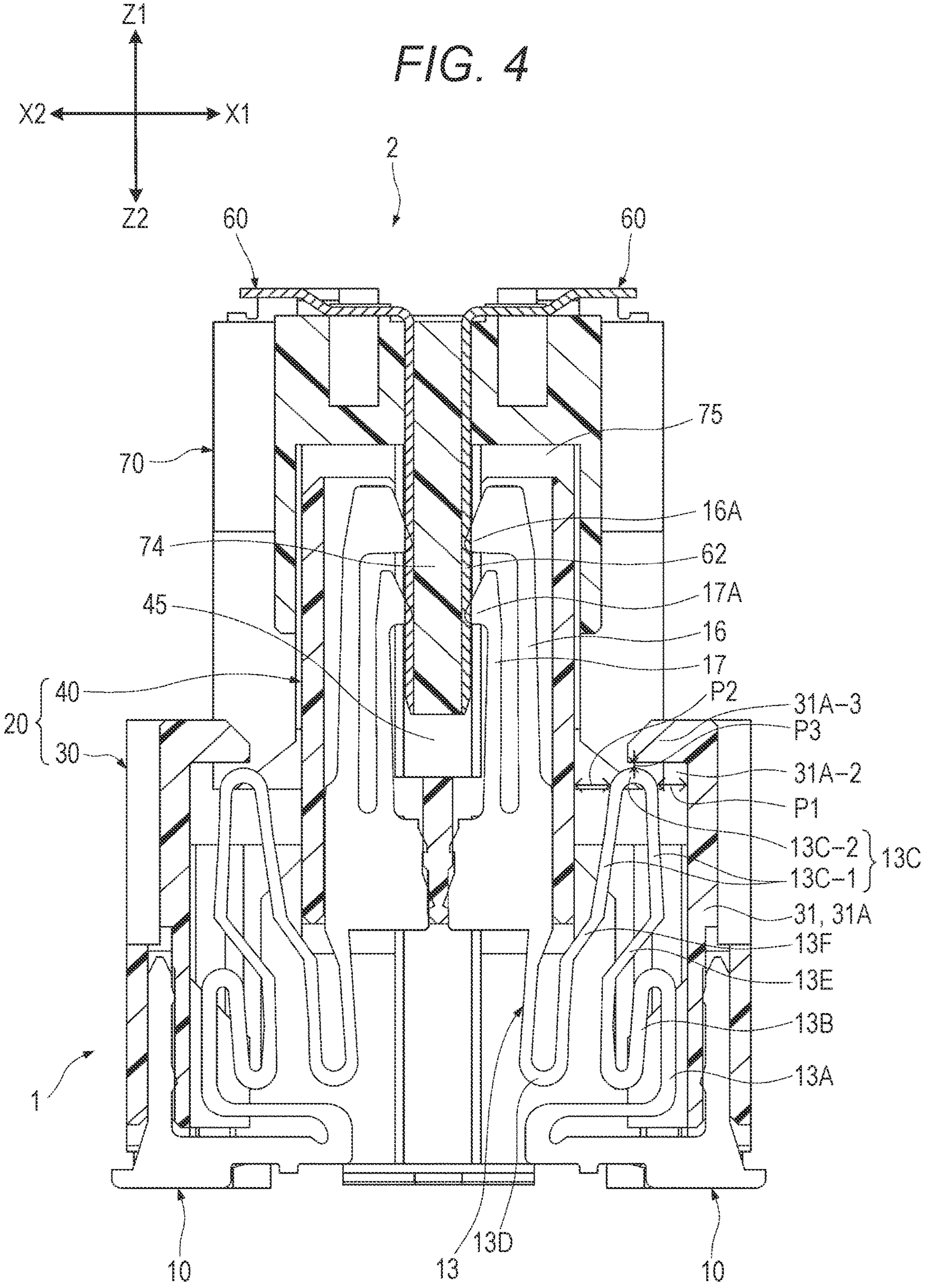
FIG. 4 is a cross-sectional view illustrating the cross section of the receptacle connector and the plug connector of FIG. 1 taken along the plane perpendicular to the terminal arrangement direction, illustrating a mating connection state of the both connectors.

When the plug connector 2 is mated with the receptacle connector 1, as illustrated in FIG. 4, the contact arm portions 62 of the plug terminals 60 positioned on both side surfaces of the central wall 74 of the plug connector 2 is made to abut on the contact portions 16A and 17A of the pair of receptacle terminals 10 to elastically deform these contact arm portions 16 and 17 to push them outward in the connector width direction. Thus, the contact arm portion 62 of the plug terminal 60 and the contact portions 16A and 17A of the receptacle terminal 10 are brought into contact with each other with contact pressure and are electrically connected. In this way, the mating connection operation between the receptacle connector 1 and the plug connector 2 is completed. Note that in FIG. 4, the contact arm portions 16 and 17 of the receptacle terminal 10 are at the same positions as in FIG. 2, and the contact arm portions 16A and 17A and the contact arm portion 62 are illustrated in the overlapped state. In this regard, actually, the contact arm portions 16 and 17 of the receptacle terminal 10 are elastically deformed outward in the connector width direction by this overlapped portion.

In a case where there is no deviation in the relative positions of the receptacle connector 1 and the plug connector 2 at the time when the mating connection operation is completed, the receptacle connector 1 and the plug connector 2 are in the normal positions illustrated in FIG. 4. In this normal position, the third elastic portion 13C of the receptacle terminal 10 is positioned to have the gap P1 in the connector width direction with respect to the side inner wall surface of the fixed side accommodating portion 31A-2 of the fixed housing 30, the gap P2 in the connector width direction with respect to the outer wall surface of the movable housing 40, and the gap P3 in the vertical direction with respect to the upper inner wall surface of the fixed side accommodating portion 31A-2 of the fixed housing 30.

In a case where there is deviation in the relative positions of the receptacle connector 1 and the plug connector 2 just before the connector mating is started, during the connector mating process and after the connector mating, the receptacle terminal 10 is elastically deformed in the direction in which deviation occurs and the movable housing 40 relatively moves (floats) with respect to the fixed housing 30. As a result, mating connection in a state in which deviation is absorbed is possible (see FIG. 7).

In addition, even in a case where the receptacle connector 1 and the plug connector 2 are in their normal positions (see FIG. 4) at the time when the mating connection operation is completed, after that, for example, when the connector is used in an environment where vibration occurs, the vibration is absorbed by the floating of the movable housing 40 of the receptacle connector 1.

Figure 5:
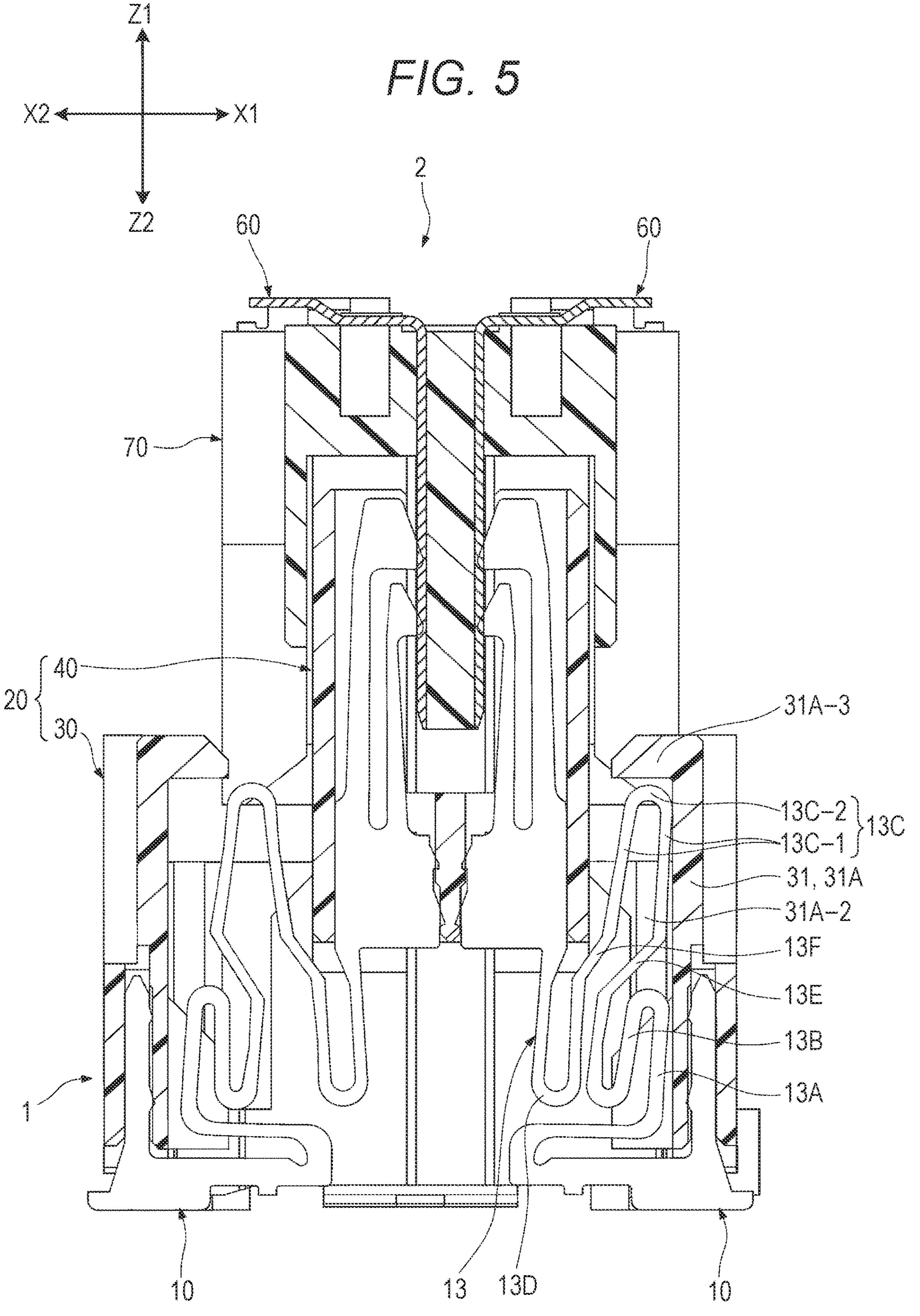
FIG. 5 is a cross-sectional view illustrating the cross section of the receptacle connector and the plug connector of FIG. 1 taken along the plane perpendicular to the terminal arrangement direction.

FIG. 5 is a cross-sectional view illustrating the receptacle connector 1 together with the plug connector 2 in a state in which the movable housing 40 floats in the connector width direction due to vibration generated during use of the connector after the connector has been mated and connected. FIG. 5 illustrates a cross section at the position of the receptacle terminal 10, taken along a plane perpendicular to the terminal arrangement direction. In addition, FIG. 5 illustrates a state in which the movable housing 40 of the receptacle connector 1 floats toward the X1 side in the connector width direction (X-axis direction). In a case where the movable housing 40 floats to the X1 side, each of elastic portions 13A to 13D of the two receptacle terminals 10 illustrated in FIG. 5, that is, both receptacle terminals 10 positioned on the X1 side and the X2 side elastically deform toward the X1 side. That is, in the intermediate portion 13 of the receptacle terminal 10 on the X1 side, each of straight portions 13A-1 to 13D-1 are deformed to narrow the interval between. On the other hand, in the intermediate portion 13 of the receptacle terminal 10 on the X2 side, each of the straight portions 13A-1 to 13D-1 are deformed to widen the interval between.

As illustrated in FIG. 5, the third elastic portion 13C of the receptacle terminal 10 positioned on the X1 side is elastically deformed in a manner that the entire third elastic portion 13C falls outward in the connector width direction the interval between the two third straight portions 13C-1 is narrowed. Such elastic deformation of the third elastic portion 13C is allowed with the gap P1 as a limit (see FIG. 4). At this time, when the frequency of vibration generated in the usage environment of the connector approaches the natural frequency of the receptacle terminal 10, the amount of deformation of the intermediate portion 13 of the receptacle terminal 10 increases. In the present embodiment, when the third elastic portion 13C is elastically deformed with the deformation amount of the above gap P1 outward in the connector width direction, as illustrated in FIG. 5, the upper portion of the third straight portions 13C-1 on the outer side (X1 side) in the connector width direction abuts on the side inner wall surface of the fixed side accommodating portion 31A-2. Therefore, further deformation of the third elastic portion 13C is restricted. Therefore, since the intermediate portion 13 is not excessively deformed, damage to the receptacle terminal 10 due to plastic deformation and the like is suppressed favorably.

In the state in which the third elastic portion 13C abuts on the side inner wall surface of the fixed side accommodating portion 31A-2, the intermediate portion 13 of the receptacle terminal 10 is elastically deformable not in the entire portion but from the abutment position to a portion positioned on the inner side in the connector width direction, that is, a portion including only the third bent portion 13C-2 of the third elastic portion 13C, the third straight portion 13C-1 on the inner side (X2 side), the movable side inclined portion 13F, and the fourth elastic portion 13D. Therefore, in the state in which the third elastic portion 13C abuts on the side inner wall surface of the fixed housing portion 31A-2, the spring length of the intermediate portion 13 is shorter than in the state in which the third elastic portion 13C does not abut on the side inner wall surface of the fixed side accommodating portion 31A-2. As a result, the natural frequency of receptacle terminal 10 increases. In other words, when the third elastic portion 13C abuts on the side inner wall surface of the fixed side accommodating portion 31A-2, difference in the frequency of vibration occurring in the usage environment of the connector and the natural frequency of the receptacle terminal 10 becomes large. Therefore, resonance is less likely to occur than before abutment.

In addition, in the present embodiment, the intermediate portion 13 is provided with the fourth elastic portion 13D and the movable side inclined portion 13F positioned between the third elastic portion 13C and the movable side held portion 12. When the intermediate portion 13 is elastically deformed and the third elastic portion 13C abuts on the side inner wall surface of the fixed side accommodating portion 31A-2, the fourth elastic portion 13D and the movable side inclined portion 13F are included in the elastically deformable portion. Therefore, when the third elastic portion 13C abuts on the above side inner wall surface, compared with the state before abutment, even in a case where the spring length of the intermediate portion 13 is shortened, sufficient floating amount can be ensured because the fourth elastic portion 13D and the movable side inclined portion 13F are elastically deformable.

Figure 6:
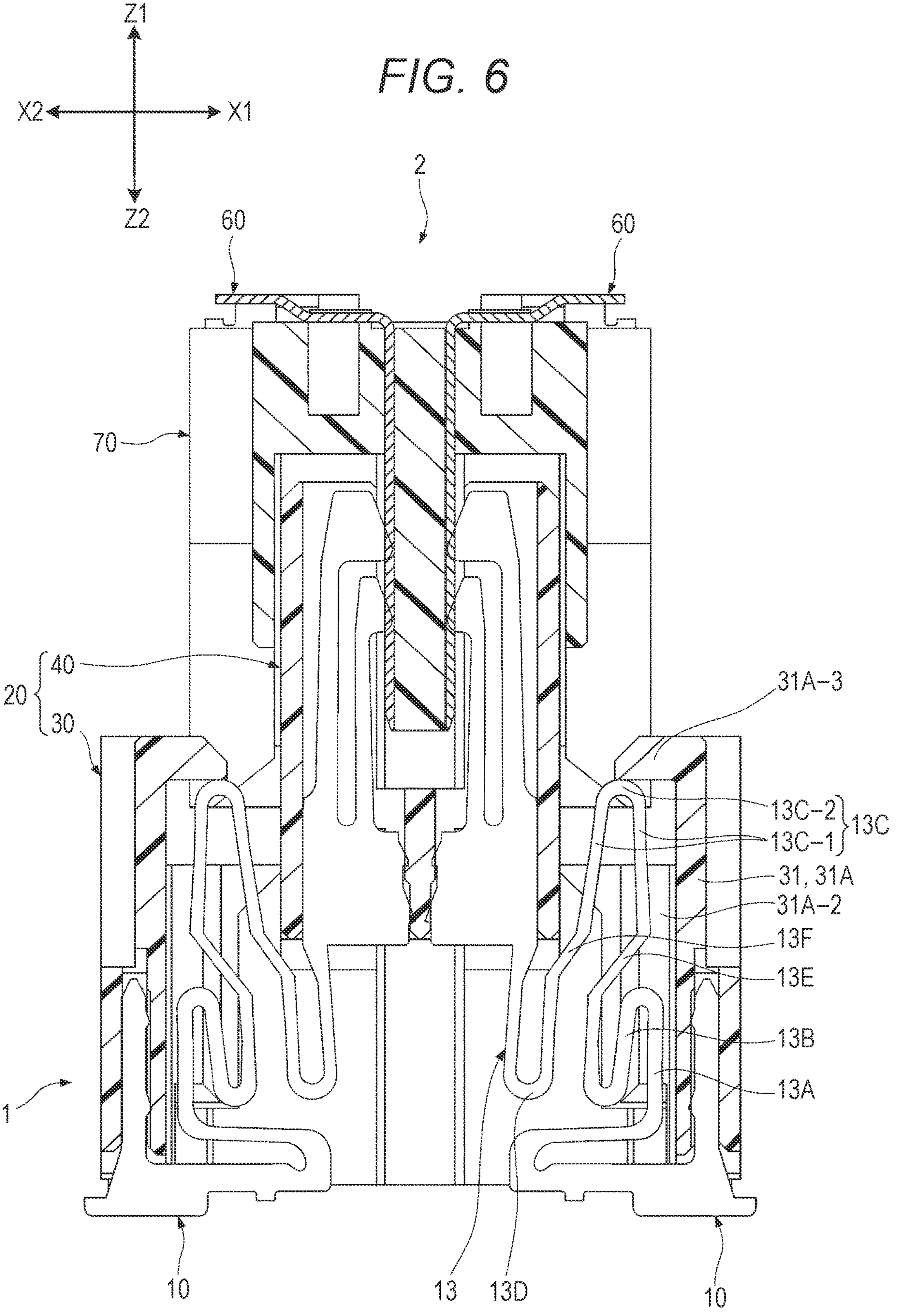
FIG. 6 is a cross-sectional view illustrating the cross section of the receptacle connector and the plug connector of FIG. 1 taken along the plane perpendicular to the terminal arrangement direction.

FIG. 6 is a cross-sectional view illustrating the receptacle connector 1 together with the plug connector 2 in a state in which the movable housing 40 floats upward due to vibration generated during use of the connector after the connector has been mated and connected. FIG. 6 illustrates a cross section at the position of the receptacle terminal 10, taken along a plane perpendicular to the terminal arrangement direction.

Upward elastic deformation of the third elastic portion 13C of the receptacle terminals 10 on both the X1 side and the X2 side is allowed with the gap P3 as a limit (see FIG. 4). In the present embodiment, as illustrated in FIG. 6, when the third elastic portion 13C elastically deforms upward with the amount of deformation of the gap P3, the third bent portion 13C-2 abuts on the upper inner wall surface of the fixed side accommodating portion 31A-2, that is, the lower surface of the top wall 31A-3. Therefore, further deformation of the third elastic portion 13C is restricted. Therefore, since the intermediate portion 13 is not excessively deformed, damage to the receptacle terminal 10 due to plastic deformation and the like is suppressed favorably.

In the state in which the third elastic portion 13C abuts on the top wall 31A-3, the intermediate portion 13 of the receptacle terminal 10 is elastically deformable not in the entire portion but from the abutment position to a portion positioned on the inner side in the connector width direction, that is, the third straight portion 13C-1 on the inner side (X2 side) of the third elastic portion 13C, the movable side inclined portion 13F, and the fourth elastic portion 13D. Therefore, in the state in which the third elastic portion 13C abuts on the top wall 31A-3, the spring length of the intermediate portion 13 is shorter than in the state in which the third elastic portion 13C does not abut on the top wall 31A-3. As a result, the natural frequency of receptacle terminal 10 increases. In other words, when the third elastic portion 13C abuts on the top wall 31A-3, difference in the frequency of vibration occurring in the usage environment of the connector and the natural frequency of the receptacle terminal 10 becomes large. Therefore, resonance is less likely to occur than before abutment.

Figure 7:
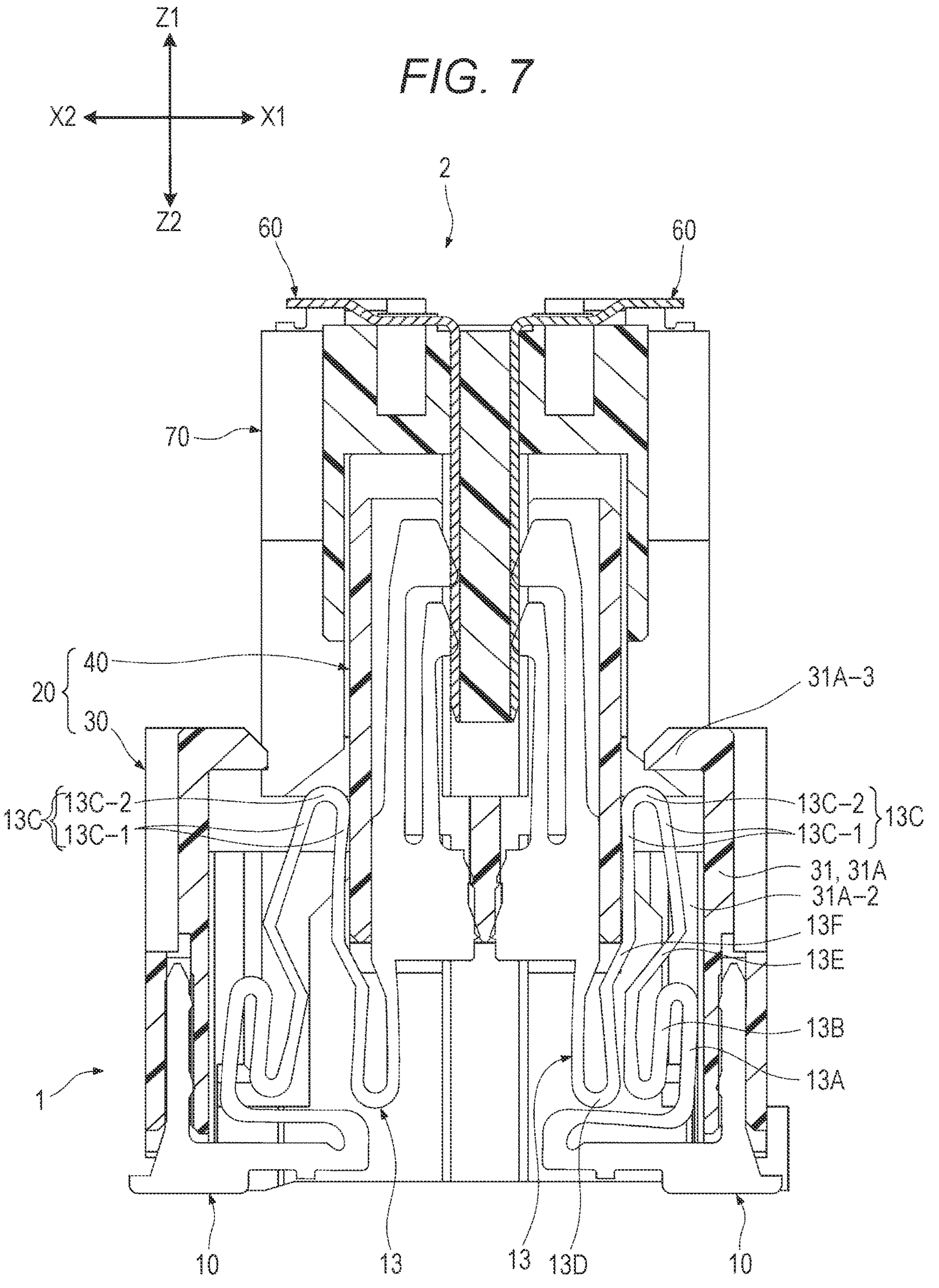
FIG. 7 is a cross-sectional view illustrating the cross section of the receptacle connector and the plug connector of FIG. 1 taken along the plane perpendicular to the terminal arrangement direction.

As described above, in a case where there is deviation in the relative positions of the receptacle connector 1 and the plug connector 2 just before the connector mating is started, deviation is absorbed because the movable housing 40 floats, FIG. 7 is a cross-sectional view illustrating the receptacle connector 1 together with the plug connector 2 in a state in which the movable housing 40 floats in the connector width direction at a time when the mating connection of a connector 1 is completed. FIG. 7 illustrates a cross section at the position of the receptacle terminal 10, taken along a plane perpendicular to the terminal arrangement direction. In addition, FIG. 7 illustrates a state in which the movable housing 40 of the receptacle connector 1 floats toward the X1 side in the connector width direction (X-axis direction).

As can be seen by comparing FIG. 7 and FIG. 5, the form of elastic deformation of the receptacle terminal 10 is different between the case where the movable housing 40 floats to absorb the deviation of the relative positions of the connectors in the connector mating process (see FIG. 7) and the case where the movable housing 40 floats by receiving vibration during the use of the connector (see FIG. 5).

As illustrated in FIG. 7, in a case where the movable housing 40 floats toward the X1 side, each of the elastic portions 13A to 13D of the receptacle terminal 10 positioned on the X1 side is deformed to narrow the interval between each of the straight portions 13A-1 to 13D-1. As a result, the third elastic portion 13C is pushed by the outer wall surface on the X1 side of the movable housing 40 that has moved to the X1 side, and abuts on outer wall surface of the movable housing 40 at the upper portion of the third straight portion 13C-1 on the inner side (X2 side) in the connector width direction.

On the other hand, at the receptacle terminal 10 positioned on the X2 side, the first elastic portion 13A, the second elastic portion 13B, and the third elastic portion 13C are elastically deformed to fall on the inner side in the connector width direction. In addition, at the same time, the straight portions 13A-1 of the first elastic portion 13A are deformed to narrow the interval between. Furthermore, the straight portions 13B-1 of the second elastic portion 13B and the straight portions 13C-1 of the third elastic portion 13C are deformed to widen the interval between. In addition, the fourth elastic portion 13D is deformed to narrow the interval between the straight portions 13D-1. When each of the elastic portions 13A to 13D is deformed, the third elastic portion 13C abuts on the outer wall surface on the X2 side of the movable housing 40 at the upper portion of the third straight portion 13C-1 on the inner side (X1 side) of the connector width direction.

The connectors 1 and 2 in a mated state illustrated in FIG. 7 are used in a state in which the third elastic portions 13C of the receptacle terminals 10 on both sides in the connector width direction abut on the outer wall surfaces on both sides of the movable housing 40. When the connectors 1 and 2 receive vibration while the connectors are in use, the receptacle terminal 10 is elastically deformed while maintaining the abutment state between the third elastic portion 13C and the movable housing 40. At this time, the intermediate portion 13 of the receptacle terminal 10 is elastically deformable not in the entire portion but from the abutment position to a portion positioned on the outer side in the connector width direction, that is, the third bent portion 13C-2 of the third elastic portion 13C, the third straight portion 13C-1 on the outer side, the fixed side inclined portion 13E, the second elastic portion 13B, and the first elastic portion 13A. Therefore, in the state in which the third elastic portion 13C abuts on the outer wall surface of the movable housing 40, the spring length of the intermediate portion 13 is shorter than in the state in which the third elastic portion 13C does not abut on the outer wall surface. As a result, the natural frequency of receptacle terminal 10 increases. In other words, when the third elastic portion 13C abuts on the movable housing 40, difference in the frequency of vibration occurring in the usage environment of the connector and the natural frequency of the receptacle terminal 10 becomes large. Therefore, resonance is less likely to occur compared with the case where there is no abutment.

In addition, in the present embodiment, when the occurrence of resonance of the terminals is avoided, the intermediate portion 13 of the receptacle terminal 10 is largely shaken not only in the connector width direction and the vertical direction but also in the terminal arrangement direction, making it difficult to deform. As a result of suppressing excessive deformation in the terminal arrangement direction, it is possible to favorably avoid the intermediate portions 13 of receptacle terminals 10 adjacent to each other in the terminal arrangement direction accidentally coming into contact with each other and short-circuit.

In the present embodiment, the intermediate portion of the receptacle terminal is provided with four elastic portions. In this regard, the number of elastic portions can. be set as appropriate. It is sufficient if two or more elastic portions are provided and at least one specific elastic portion of the two elastic portions is positioned to be different in the vertical direction from the other elastic portion and positioned to have a range overlapping in the connector width direction. At this time, in a case where there is no problem even if the connector becomes large in the vertical direction, the specific elastic portion may be provided below the other elastic portion. In addition, in the present embodiment, the specific elastic portion is provided overlapping with the other elastic portion positioned on the outer side in the connector width direction. Alternatively, the specific elastic portion may be provided to overlap with the other elastic portion located on the inner side than the specific elastic portion. At this time, in a case where the specific elastic portion is positioned overlapping with the movable housing in the vertical direction, it is preferable that the other elastic portion is provided on the outer side than the movable housing in the connector width direction The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A circuit board electrical connector comprising:

a plurality of terminals;

a fixed housing fixed to a circuit board via the terminals; and a movable housing relatively movable with respect to the fixed housing, wherein the terminals are provided to be bridged between the fixed housing and the movable housing, the terminals include a fixed side held portion held by the fixed housing, a movable side held portion positioned on an inner side in a connector width direction than the fixed side held portion and held by the movable housing, and an elastically deformable intermediate portion positioned between the fixed side held portion and the movable side held portion, the intermediate portion includes a plurality of elastic portions reversed by repeating a bending direction in a connector height direction, the plurality of elastic portions include a specific elastic portion that is positioned to be different in the connector height direction from another elastic portion and positioned to have a range overlapping in the connector width direction, the fixed side held portion includes an extended portion extending inward in the connector width direction, the terminals further include an arm portion positioned between the intermediate portion and the fixed side held portion, the arm portion extends from an inner side end portion of the extended portion outward in the connector width direction to be continuous with the intermediate portion, and the arm portion is positioned to have a gap between the arm portion and the extended portion in the connector height direction such that the arm portion is elastically deformable in the connector height direction.

2. The circuit board electrical connector according to claim 1, wherein the plurality of elastic portions further includes a movable side elastic portion that is an elastic portion positioned between the specific elastic portion and the movable side held portion besides the specific elastic portion, and at least one movable side elastic portion is positioned to have a range that overlaps with the movable side held portion in the connector width direction.

3. The circuit board electrical connector according to claim 1, wherein the plurality of elastic portions further includes a movable side elastic portion that is an elastic portion positioned between the specific elastic portion and the movable side held portion besides the specific elastic portion, and a fixed side elastic portion that is an elastic portion positioned on a side of the fixed side held portion than the specific elastic portion, the specific elastic portion is coupled to the movable side elastic portion via a movable side inclined portion and coupled to the fixed side elastic portion via a fixed side inclined portion, and the movable side inclined portion and the fixed side inclined portion are inclined toward a same side in the connector width direction.

4. The circuit board electrical connector according to claim 1, wherein the specific elastic portion includes a shape bent on a side away from the circuit board in the connector height direction, and positioned on an outer side in the connector width direction with respect to the movable side held portion, and positioned to have a range that overlaps in the connector height direction.

5. The circuit board electrical connector according to claim 2, wherein the specific elastic portion includes a shape bent on a side away from the circuit board in the connector height direction, and positioned on an outer side in the connector width direction with respect to the movable side held portion, and positioned to have a range that overlaps in the connector height direction.

6. The circuit board electrical connector according to claim 3, wherein the specific elastic portion includes a shape bent on a side away from the circuit board in the connector height direction, and positioned on an outer side in the connector width direction with respect to the movable side held portion, and positioned to have a range that overlaps in the connector height direction.

7. The circuit board electrical connector according to claim 1, wherein the arm portion is positioned within a range of the intermediate portion in the connector width direction.

* * * * *